Fig. 1.

June 15, 1965  E. P. TURNER  3,189,146
POWER TRANSMITTER

Filed June 23, 1961  6 Sheets-Sheet 3

INVENTOR.
EDGAR P. TURNER
BY
WITNESS
ATTORNEY

June 15, 1965   E. P. TURNER   3,189,146
POWER TRANSMITTER

Filed June 23, 1961   6 Sheets-Sheet 4

Fig. 6.

WITNESS
Nicholas Leszczak

INVENTOR.
EDGAR P. TURNER
BY
Marshall J. Breen
ATTORNEY

United States Patent Office 3,189,146
Patented June 15, 1965

3,189,146
POWER TRANSMITTER
Edgar P. Turner, Watchung, N.J., assignor to The Singer Company, a corporation of New Jersey
Filed June 23, 1961, Ser. No. 119,197
5 Claims. (Cl. 192—18)

This invention relates to a power transmitter for a machine drive.

It is an object of this invention to provide a novel power transmitter with which a machine may be accelerated and deceleratd in starting and stopping at accurate selectively predetermined rates.

It is an object of this invention to provide a novel fluid pressure clutch-brake control system for a power transmitter in which the flow of fluid under a constant pressure head may be regulated at accurately metered rates to provide predetermined acceleration and deceleration of a machine driven by the clutch.

Another object of this invention is to provide a novel power transmitter with which a machine may be brought to a stop in any selected one of a plurality of definite predetermined positions of the parts of the machine.

A further object of this invention is to provide a power transmitter control system capable of sensing any of a plurality of machine conditions requiring the machine to be stopped, such as malfunctions or the completion of machine operations, and automatically stopping the machine in a position of parts most suitable for remedying the particular conditions requiring the machine to be stopped.

With the above and additional objects and advantages in view as will hereinafter appear, this invention comprises the devices, combinations and arrangements of parts hereinafter described and illustrated in the accompanying drawings of a preferred embodiment in which:

The power transmitter and the control system for the transmitter of this invention is suitable for use with any of a wide variety of different machines. The particular machine to which the transmitter is applied does not form a direct part of this invention, however, this transmitter has special utility in driving machines which require particular acceleration and deceleration characteristics, and for machines which must be stopped in various different positions of the parts depending upon the reason for the stoppage such as sewing machines which may be stopped with the needle either up or down.

By way of another example, a textile roving machine is a machine ideally suited for use with the transmitter and control system of this invention. Roving machines, as known in the art, gradually draw out and twist a fibrous textile material such as wool or cotton by way of a revolving thread guide which deposits the attenuated and twisted fibers on a cop or spool. A typical roving machine comprises many such revolving thread guides having a common drive which requires several horsepower at full speed operation but which because of the delicate nature of the roving must be accelerated and decelerated very gradually. Moreover, three principal occasions arise for stopping a roving machine. The machine may be stopped without regard to the position of parts as at the close of a working period, for lubrication, general maintenance or the like; it may be stopped because of thread or roving breakage, in which case it is desirable that the machine be stopped with the revolving thread guides disposed outwardly for ease of rethreading; or it may be stopped when a cop or spool is fully wound, in which case it is desirable that the machine be stopped with the revolving thread guides disposed inwardly to provide clearance for ready exchange of cops or bobbins.

Figure 1:
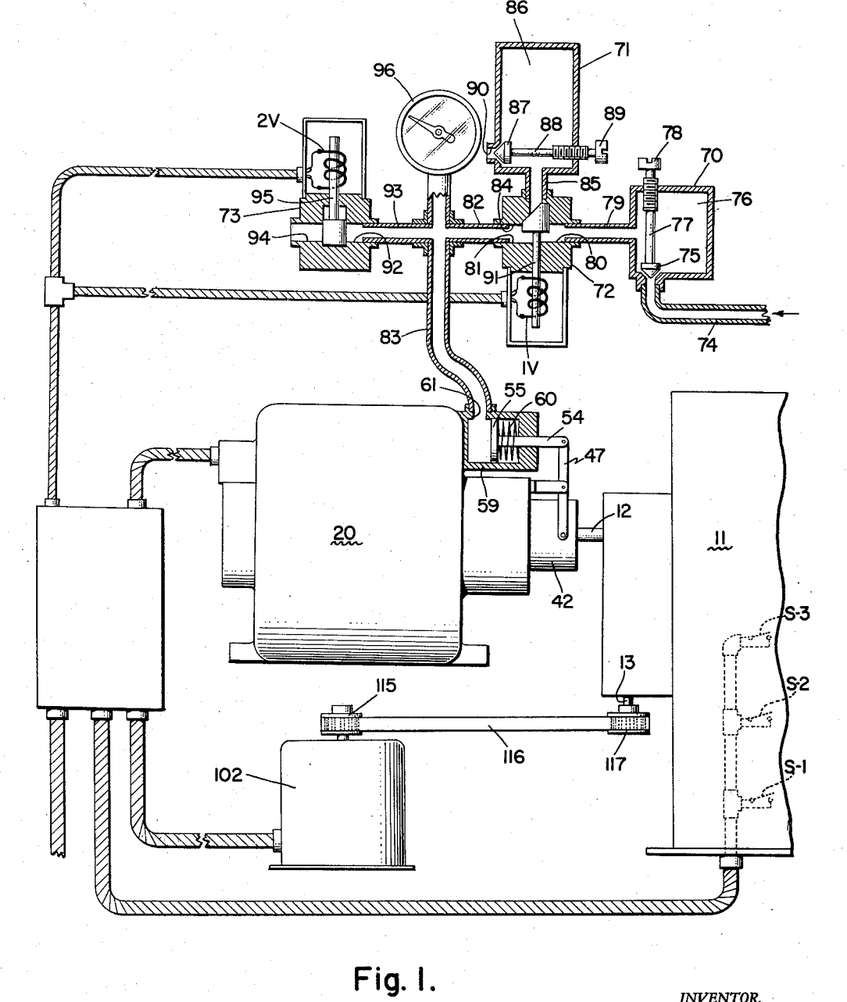
FIG. 1 represents a diagrammatic layout of the power transmitter and control system of this invention as applied to an electric motor drive of a machine.

In FIG. 1 of the drawings a roving machine is indicated diagrammatically at 11. A drive shaft 12 of the machine common to a plurality of revolving thread guides (not shown) is also drivingly connected to a timing shaft 13 which rotates in synchronism with the revolving thread guides and is used, as will be described hereinbelow, in the control system for determining a definite stopped position of the parts of the machine.

Associated with the roving machine 11 is an operator influenced electrical switch S–1 serving to start the machine and to stop the machine when no particular stopped position of the machine parts is desired. Indicated at S–2 is an electrical switch which represents one of a group of interconnected electrical switches one for each of the revolving thread guides of the roving machine and each under the influence of a known thread break indicating device (not shown) operative to close the switch S–2 upon breaking of the thread or roving. Indicated at S–3 is an electrical switch which represents one of a group of interconnected electrical switches one for each of the cops being wound on the roving machine and each under the influence of a known device (not shown) operative to close the switch 16 when the cop becomes fully wound.

Figures 2, 3:
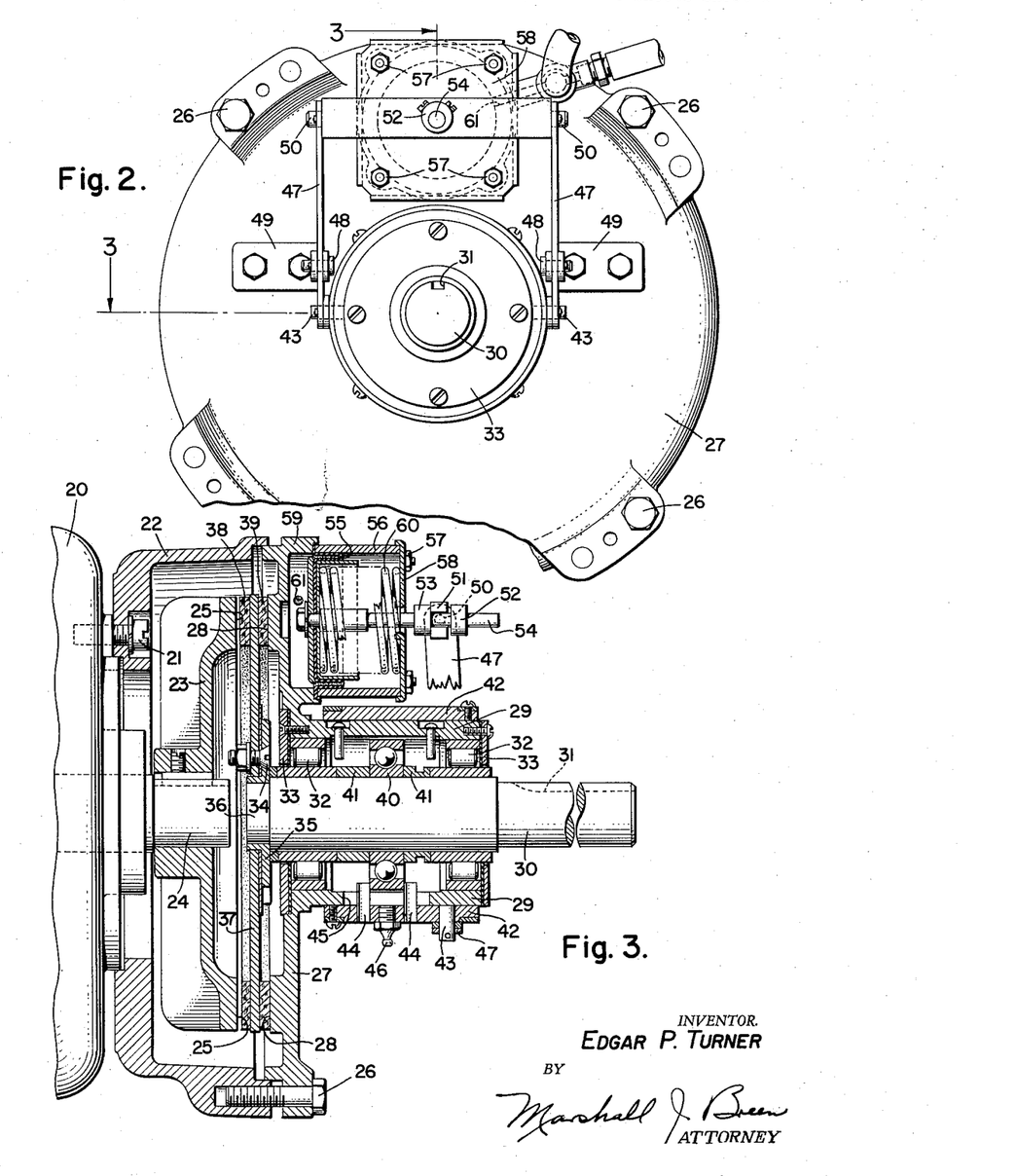
FIG. 2 represents an end elevational view of the clutch-brake mechanism carried by an electric motor.
FIG. 3 is a cross-sectional view of the clutch-brake mechanism taken substantially along line 3—3 of FIG. 2.

FIGS. 2 and 3 illustrate the clutch-brake unit which is associated with a substantially constant speed electric drive motor 20. Secured to the frame of the electric motor by bolts 21 is a bell-shaped housing 22 which encompasses a driving member in the form of a clutch disk 23 fast on the shaft 24 of the electric motor and formed with an annular clutch face 25. Secured as by bolts 26 to the bell-shaped housing 22 is a housing plate 27 which is thus fixed relatively to the electric motor frame. The housing plate 27 serves as a fixed brake member for which purpose it is formed with an annular brake face 28 opposite and spaced from the driving member clutch face 25.

The housing plate 27 is formed with a cylindrical bearing sleeve 29 in which is journaled for turning and axial sliding movement a stud shaft 30. The stud shaft 30 may comprise the free extremity of the machine drive shaft 12 if this shaft can accommodate axial movement. As illustrated in the drawings, however, the stud shaft 30 is formed with a keyway 31 to accommodate a known coupling (not shown) rotatably connecting the stud shaft 30 and the machine drive shaft 12 with provision for axial movement of the stud shaft 30. The stud shaft 30 is preferably journaled in a pair of roller bearings 32 of which the outer races are forced into the bearing sleeve 29 and the inner races forced onto the stud shaft 30. The bearing sleeve 29 is also preferably fitted with grease shields 33 beyond each of the roller bearings 32. Secured by bolts 34 to a flanged disk 35 secured fast on the shouldered extremity 36 of the stud shaft 30 is a clutch disk 37 having secured on one side thereof an annular clutch lining 38 opposite the face 25 of the driving member, and on the opposite side an annular brake lining 39 contiguous to the face 28 of the brake member.

The stud shaft 30 is moveable axially to engage alternatively the clutch or the brake by means of a ball bearing 40 constrained on the stud shaft by spacing rings 41 on the stud shaft between the roller bearings 32. A sleeve 42 slidable exteriorly on the bearing sleeve 29 has fixed therein a pair of diametrically opposed outwardly extending radial pivot pins 43 and a pair of inwardly extending radial pins 44 which pass through an elongate slot 45 in the bearing sleeve 29 and extend one on each side of the ball bearing 40. A grease fitting 46 carried in the sleeve 42 and opening onto the slot 45 is used to supply lubricant to the space between the roller bearings on the stud shaft 30.

Connected to each of the pivot pins 43 is one of a pair of clutch-brake operating levers 47 each fulcrumed as at 48 on brackets 49 carried by the housing plate 27. The operating levers 47 are pivotally connected on pins 50 extending from each end of a common lever actuating bar 51 secured by collars 52, 53 on a piston rod 54. A skirted piston 55 fast on the piston rod 54 is slidable in a cylinder 56 secured by bolts 57 and an end cover plate 58 to a cylindrical cylinder head 59 formed in the housing plate 27.

A compression spring 60 disposed between the piston 55 and the end cover plate 58 serves to bias the piston 55 toward the left as viewed in FIG. 3 acting to turn the operating levers 47 counterclockwise as viewed in FIG. 3 and thus to shift the sleeve 42 and with it the stud shaft 30 to the right bringing the brake lining 39 into frictional engagement with the brake face 28. By means of a port 61 in the cylinder head, fluid under pressure may be admitted to the cylinder 56 to act on the piston 55 overcoming the force of the compression spring 60 and shifting the clutch lining 38 into frictional engagement with the clutch face 25.

It will be appreciated that the rate at which fluid under pressure is admitted to the cylinder head and the rate at which the fluid is exhausted therefrom will influence the rate at which the clutch member 37 and the clutch and brake linings 38, 39 thereon are shifted and urged into frictional engagement with the driving and braking members respectively.

Figure 6:
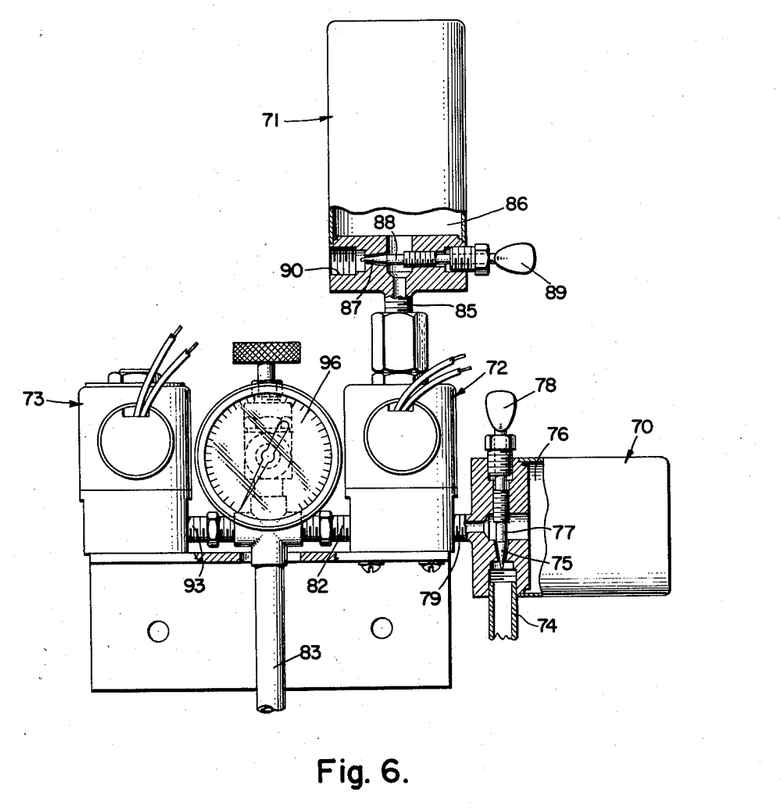
FIG. 6 is an elevational view of the pneumatic valve means of this invention with portions of the valves broken away and illustrated in vertical cross-section.

The valve means of this invention for providing an accurately metered rate of flow of fluid under pressure to and from the cylinder head 59 is illustrated diagrammatically in FIG. 1 and is also shown in FIG. 6.

The valve means comprises, generally, an adjustable intake bleeder valve unit 70, a substantially similar exhaust bleeder valve unit 71, and a solenoid operated three-way valve 72 for connecting alternatively either the intake bleeder valve unit 70 or the exhaust bleeder valve unit 71 to the cylinder head 59. Also included in the valve means is a solenoid operated exhaust valve 73 for quick exhaust of fluid pressure from the cylinder head 59 for purposes which will be described hereinbelow.

Although various fluid mediums may be employed, the device of the preferred embodiment involves a pneumatic system in which air under a constant pressure head is delivered by the conduit 74 to the intake bleeder valve unit 70. The intake bleeder valve unit includes a needle valve 75 which controls the flow of air under pressure to a small reservoir 76. The needle valve stem 77 may be provided with a finger grip 78 exteriorly of the valve unit 70 by which the needle valve may be adjusted. The reservoir 76 of the bleeder valve unit 70 communicates by means of a conduit 79 with one port 80 of the three way solenoid operated valve 72. A port 81 of the valve 72 communicates by way of conduits 82 and 83 with the port 61 of the cylinder head 59. A port 84 of the three-way valve 72 communicates by way of a conduit 85 with a small reservoir 86 forming a part of the exhaust bleeder valve unit 71. A needle valve 87 having a valve stem 88 formed with a finger grip 89 regulates the flow of air under pressure from the reservoir 86 to an exhaust port 90.

The valve stem 91 of the three-way valve 72 is influenced by a solenoid 1V to seat closing the port 84 communicating with the exhaust bleeder valve unit 71 when the solenoid is energized thus establishing communication between the valve ports 80 and 81. When the solenoid 1V is deenergized the valve stem will seat closing the port 80 of the three-way valve 72 and establishing communication between the valve ports 81 and 84.

The solenoid operated valve 73 is provided with a port 92 communicating by means of a conduit 93 with the conduit 83 leading to the cylinder head and with an exhaust port 94 opening directly to the atmosphere. A valve stem 95 is influenced by a solenoid 2V to open communication between the valve ports 92 and 94 when the solenoid is energized and to close when the solenoid is deenergized. A pressure gauge 96 may be included in the conduit 83 leading to the cylinder head.

The diagrammatic illustration of FIG. 1 shows the position of parts in the valve means while the machine 11 is operating. The solenoid 1V will be energized by an electrical control means to be described hereinbelow and the solenoid 2V will be deenergized. Air under pressure will be admitted from the intake conduit 74 through the bleeder valve unit 70, through the ports 80, 81 of the solenoid operated valve 72, and thence to the cylinder head; the pressure in the cylinder head 59 will have attained that of the constant source of pressure.

When the machine is to be stopped from a normal running condition the solenoid 1V will be deenergized by the electrical control means to be described later. The valve stem 91 of the three-way valve 72 will then close the valve port 80 sealing off the intake bleeder valve 70 leaving the reservoir 76 thereof with a pressure equal to that of the constant source of pressure and opening communication between the valve ports 81 and 84. The reservoir 86 of the exhaust bleeder valve unit 71 being initially at atmospheric pressure by way of the needle valve 87, will immediately accommodate a volume of air under pressure from the cylinder head 59 and the conduits 82, 83 and 93. The size of the reservoir 86 is preferably made such that this initial accommodation of air from the system and the consequent reduction in pressure therein is sufficient to permit the clutch lining 38 to be shifted by the compression spring 60 out of driving relation with the clutch face 25 while still maintaining sufficient pressure in the system to prevent the compression spring 60 from urging the brake lining 39 into engagement with the brake face 28. Immediately, however, the needle valve 87 of the exhaust bleeder valve unit 71 will begin to bleed air out of the reservoir 86 and the conduits communicating with the cylinder head at a rate determined by the needle valve adjustment. The application of normal forces between the brake lining 39 and the brake face 28 by the spring 60 will thus be increased gradually at a rate proportional to the adjustment of the needle valve 87 and the rate of deceleration of the machine 11 may thus be controlled very accurately.

When the machine 11 is at rest, the pressure in the cylinder head 59 will be equal to that of atmosphere pressure, such pressure equalization having been attained gradually through the needle valve 87. When the machine 11 is to be started, the solenoid 1V is energized by an electrical control means to be described hereinbelow which shifts the valve stem 91 of the three-way valve 72 into the position illustrated in FIG. 1 and immediately connects the reservoir 76 of the intake bleeder valve unit 70 to the cylinder head 59. Since the reservoir 76 is maintained at full line pressure by way of the needle valve 75, the reservoir 76 in being suddenly opened to the conduits 82, 83, 93 and the cylinder head 59, will immediately raised the pressure in the cylinder head from atmospheric pressure to a fraction of the full pressure which is provided by the constant pressure source. The amount of this initial pressure rise is dependent upon the volume of the reservoir as compared with the volume of the reservoir plus that of the conduits leading to the cylinder head and that of the cylinder head itself. Preferably, the reservoir 76 is made of such a size as to provide sufficient pressure rise in the system as to shift the disk 37 and brake lining 39 out of engagement with the brake face 28 and to make initial contact between the clutch face 25 and the clutch lining 38. Immediately, however, the needle valve 75 of the intake bleeder valve unit 70 will begin to bleed air from the source of constant pressure in the line 74 into the reservoir 76 and the conduits communicating with the cylinder head at a rate determined by the needle valve adjustment. The application of normal forces between the clutch lining 38 and the clutch face 25 will thus be increased gradually at a rate proportional to the adjustment of the needle valve 75 and the rate of acceleration of the machine 11 may thus be controlled very accurately.

It is pointed out that although the arrangement of the intake and exhaust bleeder valve units 70 and 71 are similar, the size of the reservoirs 76 and 86 thereof need not be identical. For instance, it might be desirable for the reservoir 86 to be somewhat larger than the reservoir 76 to provide for considerable initial braking of the machine to overcome the inertia forces thereof particularly where large and heavy machinery is involved. Likewise, the adjustment of the needle valves 75 and 86 may be different to provide for a rate of acceleration different from that of deceleration.

With reference to the wiring diagram of FIG. 7, the electrical controls for starting the machine 11 and for stopping the machine in random stopped position of the machine parts will now be described.

Figure 7:
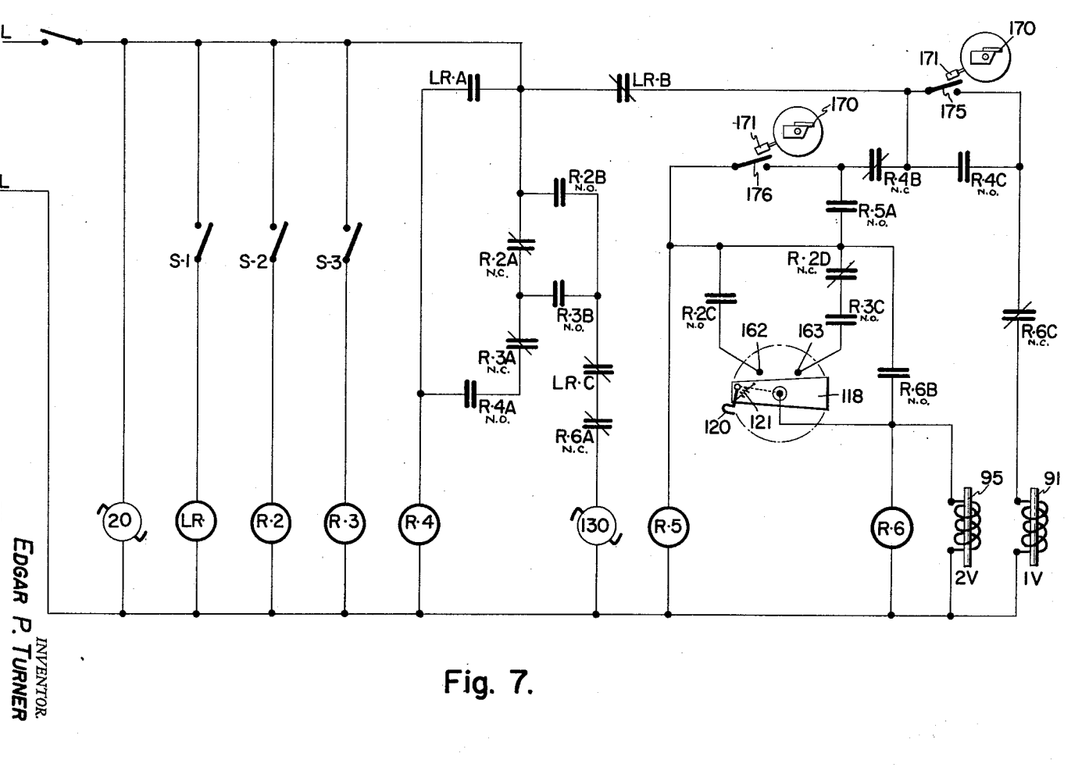
FIG. 7 is a wiring diagram of an electrical control system for this invention.

FIG. 7 represents an across the line wiring diagram in which LR indicates a conventional latching relay, that is, a relay which is controlled by an electrically operated latching device to reverse the positions of contacts associated with the relay each time the latching relay is energized and to maintain the contacts so reversed until the succeeding energization of the latching relay. The designation R in the diagram refers to a plain relay which reverses the normal position, either normally open or normally closed, of the contact associated therewith only during and as long as the relay remains energized. In the diagram the relay contacts are designated by the designation of the relay with which they are associated followed by a distinguishing letter, thus the contacts of relay R-2 are designated as R-2A, R-2B, etc. Since the contacts LR-A, LR-B and LR-C are mechanically operated by the latching relay the presence or absence of a diagonal solid line thereon does not indicate the normally closed or normally open nature of the contacts as it does in the case of the plain relays, but instead refers to the discrete positions of the latching relay contacts, that is, with relation to each other.

Referring to FIG. 7, the operator influenced start and stop switch S-1 is wired in series across the line L—L with the energizing coil of the latching relay LR. Latching relay contacts LR-A are arranged in series across the line with a plain relay R-4 and the contacts LR-A are in parallel with a holding circuit including the contacts R-4A. In series across the line with both of the solenoids 1V and 2V are the latching relay contacts LR-B and in addition, the plain relay contacts R-4B are in series across the line with the solenoid 2V, and the contacts R-4C are in series across the line with the solenoid 1V. All other relays, contacts, etc. in the circuit serve in definite stop positioning of the machine and will be described later since their actuation is not involved in normal start and random position stopping of the machine.

In FIG. 7 the relay contacts are illustrated in the condition which they occupy when the machine 11 is stopped and all of the plain relays deenergized. To start the machine, the switch S-1 is twice closed momentarily. On the first closure of the switch S-1 energization of the latching relay LR closes LR-A energizing relay R-4. The contacts R-4A will then be closed holding in the relay R-4 and the contacts R-4B will be held open while the contacts R-4C will be held closed. On the second closure of the switch S-1, the contacts LR-B will be closed completing the circuit through the closed contacts R-4C to the solenoid 1V and the solenoid operated valve 72 will assume the position illustrated in FIG. 1 causing gradual engagement of the clutch between the motor 20 and the machine 11 as described above. When the switch S-1 is next momentarily closed, the pulsing of the latching relay LR will open the contacts LR-B deenergizing the solenoid 1V causing gradual braking of the machine as described above. So long as switches S-2 and S-3 remain open, i.e., in the absence of thread breakage or a cop becoming fully wound, the machine will be started and stopped on alternate closures of the switch S-1.

Figure 4:
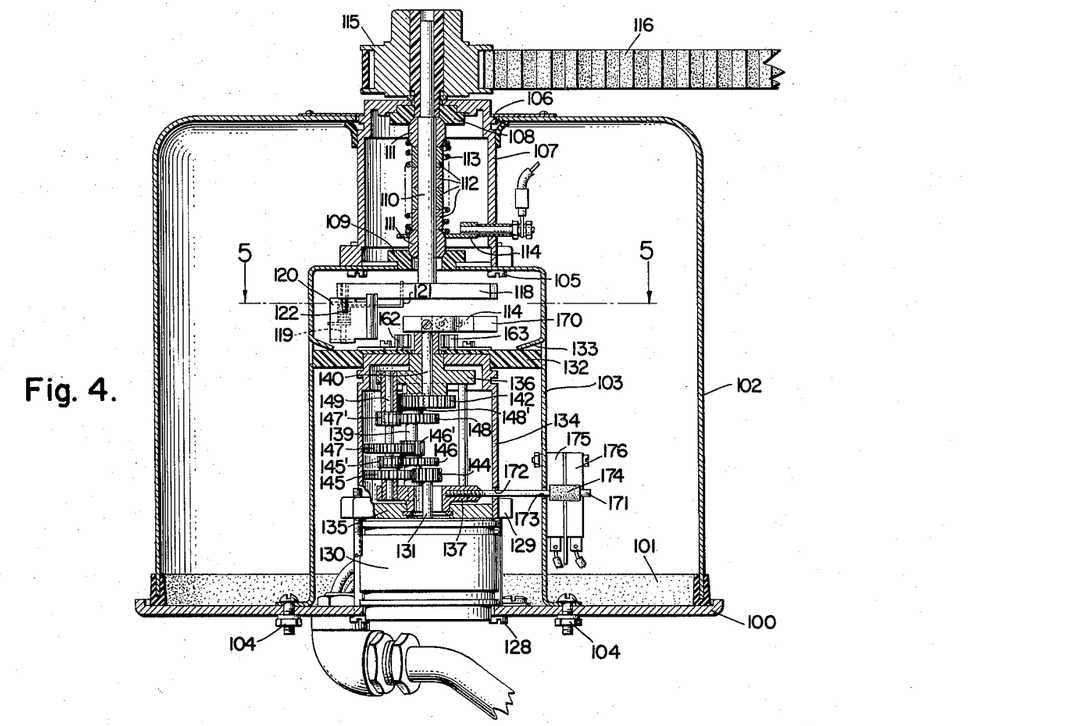
FIG. 4 is a vertical cross-sectional view of the definite stop position control mechanism.
Figure 5:
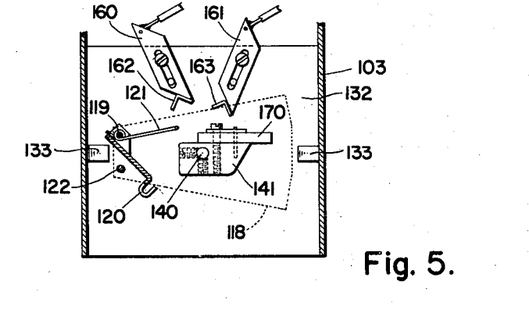
FIG. 5 is a horizontal cross-sectional view taken substantially along line 5—5 of FIG. 4.

Referring to FIGS. 1, 4 and 5, the sensing device will now be described whereby the machine 11 may be stopped in any one of a plurality of predetermined positions of the parts of the machine.

In FIG. 4 the base of the sensing device is indicated at 100 and supports by means of a peripheral gasket 101 an external sheet metal casing 102 within which an internal sheet metal casing 103 is secured to the base by fastening bolts 104. Secured to the top of the internal casing 103 by screws 105 and fitted into an aperture 106 in the external casing 102 is a cylindrical sleeve 107 sustaining a bushing 108 of insulating material which cooperates with a similar bushing 109 of insulating material seated in the top of the internal casing 103 rotatably to support a shaft 110. The shaft 110 is provided with metallic bearing collars 111 separated by spacers 112 into snug engagement with the bushings 108 and 109 and a coil spring 113 between the bearing collars 111 urges an electrical contact element 114 mounted in the cage 107 against one of the bearing collars 111. At the upper extremity the shaft 111 carries a sprocket 115 driven by a lugged timing belt 116 from a similar sprocket 117 carried on the timing shaft 13 of the machine as illustrated in FIG. 1. The shaft 110 which is thus rotated in synchronism with the rotating thread guides of the roving machine, carries a metallic trapezoidal shaped rotator 118 at its lower extremity. Pivoted on a pin 119 in the rotator 118 is a metallic switch arm 120 biased by the spring 121 toward the shaft 111, that is, biased counterclockwise about the pivot pin 119 as view in FIG. 5 but subject to the action of centrifugal forces during operation of the machine to be urged outwardly against the action of the spring 121 and against a stop pin 122 on the rotator 118.

Secured to the base 100 by bolts 128 and a retaining ring 129 is a small constant speed electric motor 130 having an upstanding vertical shaft 131. Clamped between the motor 130 and a plate 132 of insulating material held by inturned lugs 133 formed on the internal sheet metal casing 103 is a cylindrical gear housing 134 which extends within the retaining ring 129 and which accommodates a bushing disk 135 resting on the motor 130. Journaled in the gear housing 134 and in the bushing disk 135 is a gear cage comprising vertically spaced annular bearing members 136 and 137 secured rigidly together by diametrically opposite and parallel pins 138, 139. Journaled in the upper annular bearing member 136 is a stud shaft 140 having fixed thereto above the disk 132 a timing rotor 141 and fixed thereto beneath the bearing member 135 a driven pinion 142. The shaft 131 of the motor 130 extends through a clearance aperture 143 in the lower annular bearing member 137 of the gear cage and has fast thereon a drive pinion 144. The drive pinion 144 is operatively connected to the driven pinion 142 by means of a plurality of sets of meshing back gears 145, 145'; 146, 146'; 147, 147'; and 148, 148' each set of back gears comprising two pinions of different pitch diameter secured together coaxially. The back gear sets 146, 146′ and 148, 148′ are journaled freely on the pin 138 fixed between the bearing members 136 and 137 while the back gear set 147, 147′ is fast on a shaft 149 journaled between the bearing members 136 and 137 and the back gear set 145, 145′ is freely journaled on the shaft 149. In the preferred embodiment illustrated in the drawings, the drive pinion 142 and the back gears 145′ 146′, 147′ and 148′ have ten teeth while the back gears 145, 146, 147 and 148 and the driven pinion 142 have twenty-four teeth thus providing a speed reduction of approximately 80–1 between the motor shaft 31 and the timing rotor 141. With any given motor 130 the speed of the timing rotor may, however, be changed by changing the gear ratio or the number of sets of back gears used. By the arrangement which will now be described, it will be understood that the constant speed of the timing rotor 141 when the motor 130 is operated, represents the predetermined speed slower than that of the speed drive shaft 12 in response to the motor 20 at which the machine 11 will be moved into a predetermined position of the parts in those instances in which a definite stopped position is to be had.

Secured on the disk 132 of insulating material are a pair of metallic brackets 160 and 161 each formed with an upstanding electrical contact post 162 and 163 respectively. The contact posts 162 and 163 are disposed equidistant from the stud shaft 140 and within the path of the switch arm 120 when the switch arm is urged inwardly by the spring 121. The contact posts, however, are disposed inwardly of the path of motion of the switch arm 120 when the switch arm is thrown outwardly by centrifugal forces during operation of the machine 11 at normal speeds. Since the switch arm 120 and the rotator 118 are driven in synchronism with the machine 11, the angular position of the contact posts 162 and 163 relatively to the switch arm 120 corresponds directly with two discrete stopped positions of the machine 11. The contact posts may, therefore, be positioned on the disk 132 to provide for any selected definite stopped positions of the machine.

The rotor 141, driven at reduced speed by the motor 130, has secured to it a substantially radial finger 170 within the path of motion of which the switch arm 120 projects when the centrifugal forces are overcome by the spring 121. With reference to FIG. 4 it will be noted that the gear cage comprising the bearing members 136 and 137 and the pins 138 and 139 rigidly joining the bearing members is freely journaled in the gear housing 134 and the bushing disk 135. A radial arm 171 secured in the bearing member 137 of the gear cage extends outwardly through a clearance slot 172 in the gear housing 134 and a clearance slot 173 in the internal sheet metal casing 103 and is provided at its free extremity with a pad 174 abutting a pair of spring loaded normally open microswitches 175 and 176 carried in the internal sheet metal casing 103. The spring loading provided by the microswitches 175 and 176 on the arm 171 is sufficient to constrain the gear cage as long as the rotor 141 is free to turn unimpeded. However, when the machine 11 is decelerated to the degree that the switch arm 120 turns at a slower rate than that of the rotor 141 and the centrifugal forces acting on the switch arm are overcome by the spring 121, the rotation of the rotor 141 will be impeded by contact of the finger 170 with the switch arm 120. The driven pinion 142 will then begin to assume the character of a reaction element and the driven pinion 144 on the motor shaft will apply a torque on the gear cage urging the radial arm 171 against the microswitches 175 and 176 to close these switches.

With reference to the wiring diagram of FIG. 7 the arrangement of this invention will now be described whereby the repeated closure of the microswitches 175, 176 in response to mechanical contact of the rotor finger 170 with switch arm 120 is utilized to drive the machine 11 into a predetermined stopped position of the machine parts.

As described hereinbefore, when the machine 11 is running during normal operation the latching relay contacts will be in the condition illustrated in FIG. 7 with contacts LR–B and LR–C closed. Furthermore, the relay R–4 will have been energized and so maintained by its own contacts R–4A in the holding circuit so that contacts R–4B will be held open and contacts R–4C held closed.

The thread break indicating switch S–2 on the machine 11 is wired in series across the line with a plain relay R–2 and the full cop indicating switch S–3 on the machine is wired in series across the line with a plain relay R–3. What is about to be described is the result which will be obtained when one or both of the switches S–2 and S–3 is closed and held closed during operation of the machine.

Each of the relays R–2 and R–3 includes normally closed contacts R–2A and R–3A respectively in the holding circuit for the relay R–4 such that upon closure of one or both of the switches S–2 and S–3 the relay R–4 will be deenergized. Contacts R–4C will thus be opened to deenergize the solenoid operated valve 1V and the machine 11 will begin deceleration. Contacts R–4B will be closed in preparation for the operation of the sensing device but the closure of contacts R–4B does not in and of itself energize the sensing device.

Each of the relays R–2 and R–3 includes normally open contacts R–2B and R–3B respectively which are disposed in series across the line with the motor 130 of the sensing device such that upon closure of one or both of the switches S–2 and S–3, the motor 130 will be operated and the rotor 141 and radial finger 170 thereon will begin rotation at a constant speed. The machine continues normal deceleration until the rotator 118 and switch arm 120 thereon have decelerated to the point at which the switch arm 120 is moved inwardly by the spring 121 and the switch arm rotates at a slower speed than that of the radial finger 170. When the radial finger 170 is driven against the switch arm 120 causing the radial arm 171 to close the microswitches 175 and 176, the closing of microswitch 175 energizes the solenoid operated valve 1V thus accelerating the machine 11 and with it the switch arm 120. Acceleration of the switch arm 120 will drive the switch arm ahead of the radial finger 170 relieving the torque applied to the gear cage and radial arm 171 so that the microswitches 175 and 176 will reopen. This process of alternate acceleration and deceleration of the machine and switch arm 120 and alternate opening and closing of the microswitches 175 and 176 will continue and the machine will thus be driven at the speed of the timing rotor 141 and the radial finger 170 thereon.

The means will now be described for stopping the machine 11 with the drive shaft 12 in a selected one of a plurality of definite positions of rotation. When the radial finger 170 is first driven against the switch arm 120 causing the radial arm 171 to close the microswitch 176, the relay R–5 will be energized. The contacts R–5A will then be closed completing a holding circuit across the line maintaining the relay R–5 energized.

Also arranged in series across the line with the contacts R–5A of the holding circuit for the relay R–5 are three elements, first, the rotary switch unit comprising separate lines from the contacts R–5A to each of the contact posts 162 and 163, and a common line from the rotary switch arm 120; second, the solenoid operated valve 2V; and third, a plain relay R–6.

In the line to the contact post 162 are contacts R–2C which are closed to render the contact post 162 effective only when the thread break indicating switch S–2 is closed. In the line to the contact post 163 are contacts R–3C which are closed to render the contact post 163 effective only when the full cop indicating switch S–3 is closed. In series with the contacts R–3C in the line to the contact post 163 may also be the normally closed contacts R–2D which will therefore only render the contact post 163 effective when the thread break indicating switch is open, that is, the contacts R–2D constitute a preference arrangement such that the thread break indicating switch S–2 will always take preference to the full cop indicating switch.

When the switch arm 120 is driven by alternate acceleration and deceleration into contact with whichever of the contact posts 162 or 163 is effective, both the relay R–6 and the solenoid operated valve 2V will be energized. The contacts R–6A in series with the motor 130 of the sensing device will be opened terminating operation of the sensing device. The contacts R–6B in a holding circuit for the relay R–6 will close maintaining relay R–6 energized even if the switch arm should override the effective contact post 162 or 163 slightly. Furthermore, the holding circuit for the relay R–6 also provides a circuit across the line for the solenoid operated valve 2V. The contacts R–6C in series with the solenoid operated valve 1V will be opened thus preventing starting of the machine until the condition which closed either of the switches S–2 or S–3 is remedied. The operation of the solenoid operated valve 2V provides for a rapid release of the pressure from the cylinder head 59 and a sudden stopping of the machine 11 in the definite predetermined position of the parts.

When both of the switches S–2 and S–3 are again opened by virtue of the remedy of the thread breakage or replacement of a full cop, the contacts R–2A and R–3A in the holding circuit for relay R–4 will be closed and the operator influenced switch S–1 will again be effective in two successive closures to start the machine. On the first closure of the switch S–1 energization of the latching relay LR will open contacts LR–B to deenergize the relays R–5 and R–6, and the solenoid operated exhaust valve 2V, and will close the contacts LR–A to energize the relay R–4. With contacts R–6C in normally closed position and contacts R–4C held closed by the energized relay R–4, succeeding closures of the operator influenced switch S–1 will by way of the contacts LR–B effect alternate random starting and stopping of the machine by energizing and deenergizing the solenoid operated valve 1V.

The above described arrangement, as illustrated in the diagram of FIG. 7, is suitable for a machine such as a roving machine wherein the means for determining a particular definite stopped position are rendered effective during operation of the machine as by thread breakage or completion of cop winding. In the above described embodiment, the occurrence of these determining events and closure of either switch S–2 or S–3 in FIG. 7 initiates stopping of the machine.

Figure 8:
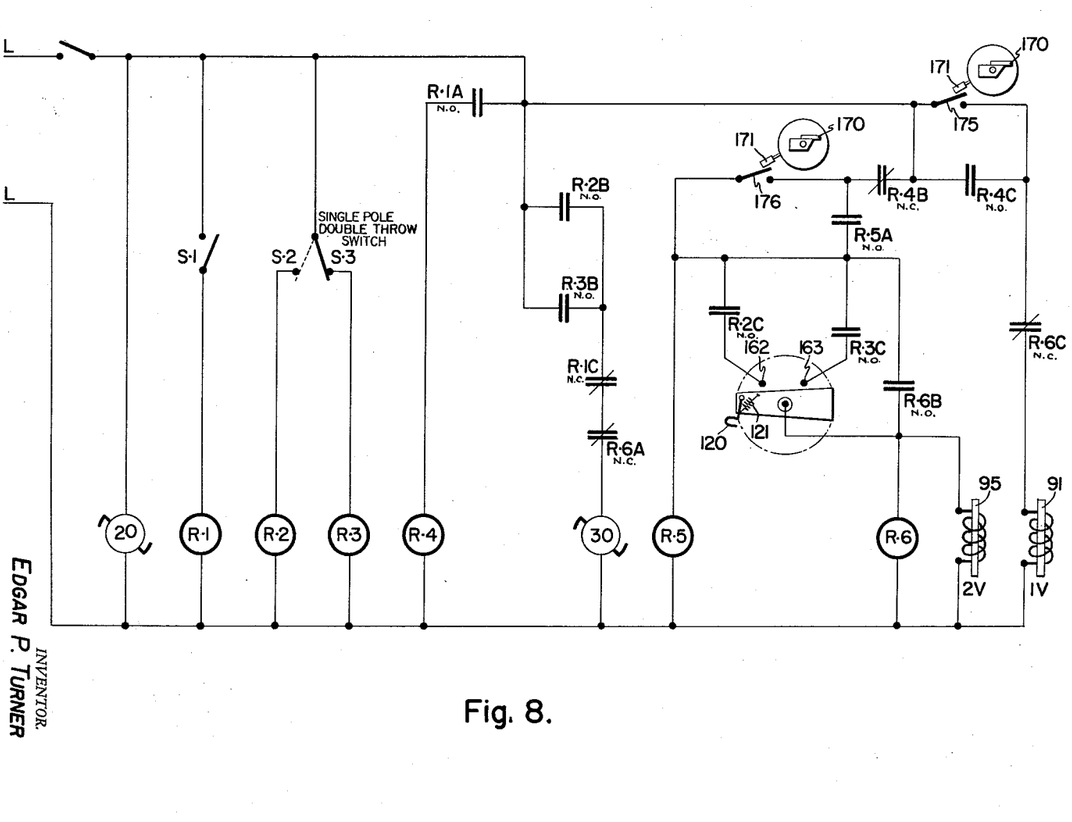
FIG. 8 is a wiring diagram of a modified electrical control system for this invention.

In the operation of other types of machines, however, it may be desirable to establish an arrangement for providing a definite stopped position which will take effect only after stopping is initiated by other means. Such a system, as illustrated in the modified wiring diagram of FIG. 8, is particularly suitable, for instance, for driving a sewing machine wherein the stopping and starting of the sewing machine is always to be initiated by opening and closing of the switch S–1 as by a foot treadle or the like. In FIG. 8 the switches S–2 and S–3 comprise a single pole double throw switch which may have a neutral position and which is correlated such that when switch S–2 is closed the sewing machine will be stopped with the needle down; when switch S–3 is closed, with the needle up, and when in neutral position, a random stopped position. Closure of the switches S–2 or S–3 in the system of FIG. 8 will not, however, initiate stopping of the sewing machine.

In the system illustrated in FIG. 8, the switch S–1 is in series with a plain relay R–1 of which contacts R–1A are in series with the plain relay R–4. Contacts R–4C control the operation of the solenoid 1V as in the embodiment illustrated in FIG. 7. The normally closed contacts R–1C are in series with the motor 30 such that the motor may be operated only when the switch S–1 is opened.

The switches S–2 and S–3 in the systems illustrated in FIG. 8 are arranged in series with relays R–2 and R–3, respectively, as in the system illustrated in FIG. 7. Similarly, the contacts R–2B and R–3B are arranged in the connections to the motor 30 and the contacts R–2C and R–3C are arranged in the connections to the switch contacts 162 and 163 as in the version illustrated in FIG. 7 so that the machine will be driven at a predetermined slow speed and stopped in a selected definite position of parts in precisely the same fashion with the system of FIG. 8 as with that of FIG. 7.

In FIG. 8, however, the contacts R–2A and R–3A in the connections to the relay R–4 have been eliminated such that closure of either switch S–2 or S–3 cannot initiate stopping of the machine.

Having thus set forth the nature of this invention, what I claim herein is:

1. In a power transmitter for the drive shaft of a machine including a constant speed motor, a driving member rotatable with said motor, a fixed brake member spaced from said driving member, and a clutch member disposed between said driving member and said brake member; said clutch member being rotatable with said drive shaft and shiftable axially into frictional engagement with said driving member or said brake member, spring means for biasing said clutch member axially into engagement with said brake member, fluid pressure operated piston means for shifting said clutch member axially in opposition to said spring means, a fluid pressure intake line operatively connected to said piston means and adapted to be connected to a source of fluid under substantially constant pressure, an exhaust line open to atmospheric pressure, valve means for selectively connecting said piston means to said intake or said exhaust line, separate fluid flow regulating means in said intake and exhaust lines providing in said intake line a selected substantially fixed rate of flow of fluid under pressure to said piston means from said source, and providing in said exhaust line a selected substantially fixed rate of flow of fluid under pressure from said piston means to atmospheric pressure, a reservoir connected in said intake line between said valve means and said flow regulating means for accumulating fluid from said source under the substantially constant pressure thereof, said reservoir being formed of that size relatively to said intake line, said piston means, and the force of said spring means, to contain only sufficient fluid under the constant pressure of said source as to shift said clutch member out of engagement with said brake member immediately upon opening of said intake line by said valve means, and a second reservoir connected in said exhaust line between said valve means and said flow regulating means therein for establishing an equilibrium at atmospheric pressure while said valve means connects said piston means with said intake line, said second reservoir being of that size relatively to said exhaust line, said piston means and the force of said spring means to contain only sufficient fluid from said piston means and said exhaust line immediately upon connection of said exhaust line with said piston means by said valve means as to shift said clutch member out of engagement with said driving member immediately upon connection of said exhaust line with said piston means by said valve means.

2. In a power transmitter for the drive shaft of a machine including a constant speed motor and a clutch-brake unit operatively interposed between said motor and said machine drive shaft, a fluid pressure operated control means for said clutch-brake unit, an intake line adapted to be connected to a source of fluid under substantially constant pressure, an exhaust line, valve means for selectively connecting said control means with said intake or said exhaust line, a restricted orifice disposed in said intake line for providing a metered rate of flow of fluid under pressure to said control means through said valve means, and means connected in said intake line between said valve means and said restricted orifice for accumulating a predetermined amount of fluid from said source under the substantially constant pressure thereof sufficient to provide an initial pressure rise of predetermined degree at said control means substantially faster than is provided by the metered rates of flow of fluid provided by the restricted orifice whereby upon actuation of said valve means to connect said control means with said intake line the initial operation of the clutch-brake unit is controlled by the accumulating means and the subsequent operation of the clutch-brake unit is controlled by the metered rate of flow of liquid through said restricted orifice, the initial operation being substantially faster than the subsequent operation, a restricted orifice disposed in said exhaust line for providing a metered rate of flow of fluid under pressure from said control means through said valve means, and means connected in said exhaust line between said restricted orifice disposed in said exhaust line and said valve means for accommodating a predetermined volume of fluid to initially relieve the fluid pressure at the control means substantially faster than is provided by the metered rate of flow of fluid through the restricted orifice in the exhaust line, whereby upon actuation of said valve means to connect said exhaust line the initial operation of the clutch-brake unit is controlled by the accommodating means and the subsequent operation of the clutch-brake unit is controlled by the metered rate of flow of liquid through said exhaust line restricted orifice.

3. A power transmitter as set forth in claim 2 in which said restricted orifice comprises a manually adjustable needle valve for selectively regulating the rate of flow of fluid under pressure to said control means for regulating the acceleration of said drive shaft.

4. A power transmitter as set forth in claim 2 in which said restricted orifices in said intake line and said exhaust line comprise individually adjustable needle valves for providing independent regulation of the acceleration and deceleration of said drive shaft.

5. In a power transmitter for the drive shaft of a machine including a constant speed motor, a driving member rotatable with said motor, a fixed brake member spaced from said driving member, and a clutch member disposed between said driving member and said brake member; said clutch member being rotatable with said drive shaft and shiftable axially into frictional engagement with said driving member or said brake member, spring means for biasing said clutch member axially into engagement with said brake member, fluid pressure operated piston means for shifting said clutch member axially in opposition to said spring means, an intake line operatively connected to said fluid pressure operated means and adapted to be fluidly connected to a source of fluid under substantially constant pressure, valve means for opening and closing said intake line, means, connected in said intake line between said valve means and the source of fluid, for providing a selected substantially fixed rate of flow of fluid under pressure to said piston means to control the acceleration of said drive shaft by said driving member, and means, connected in said intake line between said flow regulating means and said valve means, for accumulating a predetermined amount of fluid from the source under the substantially constant pressure thereof sufficient to shift said clutch member away from contact with said brake member and into initial contact with said driving member upon actuation of said valve means to open said intake line, means for exhausting fluid under pressure from said piston means, means for providing a selected substantially fixed rate of flow of fluid under pressure from said piston means through said exhausting means to control the deceleration of said drive shaft by said brake member, an exhaust line fluidly connected to said piston means, said valve means including means to open and close said exhaust line, and means connected in said exhaust line between said means to open and close said exhaust line and said means for exhausting fluid for accommodating a predetermined volume of fluid sufficient to shift said clutch member from engagement with said driving member and into initial engagement with said brake member.

References Cited by the Examiner
UNITED STATES PATENTS

| | | |
|---|---|---|
| 847,834 | 3/07 | Sears et al. |
| 1,970,998 | 8/34 | Ferris. |
| 2,513,812 | 7/50 | McClay. |
| 2,636,581 | 4/53 | Bitler. |
| 2,706,026 | 4/55 | Georgeff. |
| 2,722,296 | 11/55 | Stoeckicht ____________ 192—.075 |
| 2,747,715 | 5/56 | Brinkman et al. ________192—146 |
| 2,998,872 | 9/61 | Sommer et al. |
| 2,999,575 | 9/61 | Schwab _______________ 192—146 |
| 3,042,166 | 7/62 | Crane. |

DAVID J. WILLIAMOWSKY, *Primary Examiner.*